(54) METHOD FOR PROVIDING CELL LOCATION SERVICE

(75) Inventors: Jae Sung Lim; Han Sik Jang; Sul Gi Yim; Hae Kwan Jung, all of Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/111,837

(22) Filed: Jul. 8, 1998

(30) Foreign Application Priority Data

Jul. 8, 1997 (KR) .................................................. 97-31576

(51) Int. Cl.⁷ ...................................................... G01S 3/02
(52) U.S. Cl. ............................................ 455/456; 455/466
(58) Field of Search .................................... 455/456, 426, 455/433, 435, 466, 414, 458; 342/357, 450, 451

(56) References Cited

U.S. PATENT DOCUMENTS

| | | | |
|---|---|---|---|
| 5,628,051 | * | 5/1997 | Salin ..................................... 455/422 |
| 5,729,534 | * | 3/1998 | Jokinen et al. ....................... 370/280 |
| 5,768,509 | * | 6/1998 | Gunluk ............................. 395/200.33 |
| 5,797,096 | * | 8/1998 | Lupien et al. ........................ 455/433 |
| 5,978,685 | * | 11/1999 | Laiho ................................... 455/466 |
| 6,006,091 | * | 12/1999 | Lupien ................................. 455/435 |
| 6,026,305 | * | 4/2000 | Salinger et al. ...................... 455/456 |
| 6,052,597 | * | 4/2000 | Ekstrom ............................... 455/456 |
| 6,055,434 | * | 5/2000 | Seraj .................................... 455/456 |
| 6,061,561 | * | 5/2000 | Alanara et al. ...................... 455/422 |
| 6,075,993 | * | 6/2000 | Kawamoto ........................... 455/456 |
| 6,091,958 | * | 7/2000 | Bergkvist et al. ................... 455/456 |

* cited by examiner

*Primary Examiner*—William G. Trost
*Assistant Examiner*—Congvan Tran
(74) *Attorney, Agent, or Firm*—Sheridan Ross P.C.

(57) ABSTRACT

The present invention provides a method for providing cell location service in digital mobile communication network, without additional device for cell location service. The cell location center requests that a mobile station provide current location of the mobile station. Then, the mobile station transfers the base station identification currently communicating with the mobile station. The cell location center finds the location of the mobile station using the base station identification which is uniquely defined in the mobile communication network.

18 Claims, 4 Drawing Sheets

METHOD FOR PROVIDING CELL LOCATION SERVICE

BACKGROUND OF THE INVENTION

1. Technical Field of the Invention

The present invention relates to a method for providing cell location service in digital cellular mobile communication network, more particularly relates to a method for informing a cell location center of current location of a mobile station in which a base station identification is used for providing current location of the mobile station.

2. Description of the Prior Art

Many of concepts will be described below for helping to understand the preferred embodiment of the present invention.

Cell Location Service (CLS) is a service which informs the cell location center of current location of the mobile station. The cell location service may be implemented using different identifications communicated between the mobile station and the base station. Using the cell location service, vehicle location service or emergency location service may be easily implemented.

Short Message Service (SMS) is a service for transferring a short message between the mobile stations or between the mobile station and a message input terminal. The short message service is implemented by a short message service center (SMSC) which has a store and forward function.

Cell Location Center (CLC), which consists of computers, collects and processes location data of the mobile stations from the mobile communication network and provides external hosts with the location data.

Short Message Service Center (SMSC) is an apparatus which consists of computers and processes short message service, stores and forwards short messages.

Mobile Station (MS) has a function to process the cell location service. The mobile station may also process speech information.

The most prevalent location technology is the Global Positioning System (GPS). Obtaining a location fix is made possible by a timing and distance measurement, called triangulation, between a user on the earth's surface and a minimum of three of the 24 GPS satellites in orbit. GPS products are widely used in many commercial areas with mobile communication systems like cellular, personal communication systems (PCS) and paging. But GPS is unlikely to become the economic location technology because of requiring additional hardware to existing handset.

For locating mobile stations with no additional hardware, there are three basic technologies available: measuring signal attenuation, angle of arrival, or time difference of arrival (TDOA).

Most mobile station antennae are omni-directional, so power is dissipated rapidly in all directions. If the transmitted power of mobile station were known, and the power were measured at another point, distance could be estimated using one of several propagation models. But signals attenuate for reasons other than distance traveled, such as passing through walls, foliage, or glass and metal and other environmental factor.

The most common version of angle of arrival is known as small aperture direction finding, which requires a complex antenna array at each of several base stations. When several base stations can each determine their respective angle of arrival, mobile station location can be estimated from the point of intersection of projected lines drawn out from the base station at the angle from the signal originated. Small aperture angle of arrival systems suffer from distortion of the wavefront of the mobile station, caused by multipath and other environmental factors.

TDOA systems operate by placing location receivers at multiple sites geographically dispersed in a wide area; each of the sites has an accurate timing source. When a signal is transmitted from a mobile station, the signal propagates to all of the antenna sites where the signal reception is time stamped. The difference in stamps are then combined to produce intersecting hyperbolic lines from which the location is estimated. TDOA systems are also subject to many of the same urban multipath problems as angle of arrival systems.

SUMMARY OF THE INVENTION

Therefore, an object of the present invention is to provide cell location service without a separate receiver in digital cellular mobile communication network.

According to the first aspect of the present invention, this object is accomplished by providing a method for providing cell location service in a digital mobile communication network which provides short message service and comprises a plurality of mobile stations and base stations and a cell location center, the method including the steps of: a) generating and transferring, at the cell location center, a cell location request message which requests the mobile station to provide location information of the mobile station, by using the short message service, wherein the mobile station has software for implementation of cell location service; and b) receiving cell location request message, at the mobile station, and transferring a base station identification which is uniquely defined for discriminating the base station communicating with the mobile station in the digital mobile communication network, to the cell location center.

According to the second aspect of the present invention, this object is accomplished by providing a method for providing cell location service in a digital mobile communication network which provides circuit switched data service and comprises a plurality of mobile stations and base stations and a cell location center, the method including the steps of: a) generating and transferring, at the cell location center, a cell location request message which requests the mobile station to provide location information of the mobile station, by using the circuit switched data service, wherein the mobile station has software for implementation of cell location service; and b) receiving cell location request message, at the mobile station, and transferring a base station identification which is uniquely defined for discriminating the base station communicating with the mobile station in the digital mobile communication network, to the cell location center.

According to the third aspect of the present invention, this object is accomplished by providing a method for providing cell location service in a digital mobile communication network which provides packet switched data service and comprises a plurality of mobile stations and base stations and a cell location center, the method including the steps of: a) generating and transferring, at the cell location center, a cell location request message which requests the mobile station to provide location information of the mobile station, by using the packet switched data service, wherein the mobile station has software for implementation of cell location service; and b) receiving cell location request message, at the mobile station, and transferring a base station identification which is uniquely defined for discriminating the base station communicating with the mobile station in the digital mobile communication network, to the cell location center.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

The embodiments of the present invention will be described with reference to the accompanying drawings.

Figure 1:
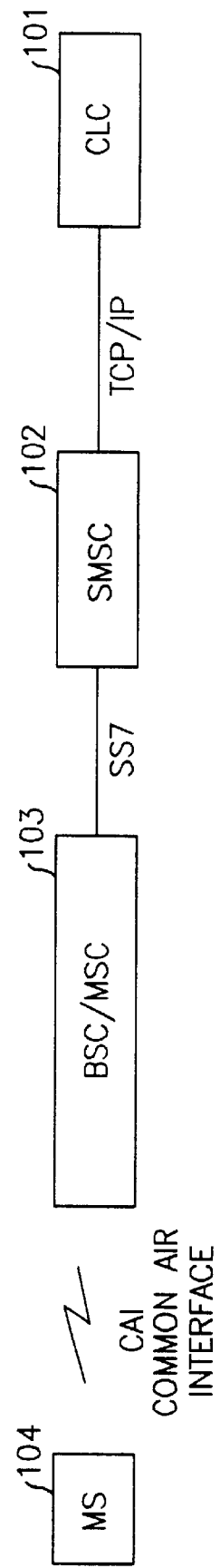
FIG. 1 is a diagram illustrating a digital mobile communication network applied to the present invention.

Referring to FIG. 1, digital mobile communication network applied to the present invention includes a cell location center (CLC) 101, a short message service center (SMSC) 102, a base station controller/mobile switching center (BSC/MSC) 103 and a plurality of mobile stations (MSs) 104.

The CLC 101 is a server which manages all information from the mobile stations, and communicates with the SMSC 102 by Transmission Control Protocol/Internet Protocol (TCP/IP).

The SMSC 102 receives messages from the CLC, generates short messages and transfers the short messages to the MS 104 through the BSC/MSC 103. Also, the SMSC 102 receives data from the MS 104 through the BSC/MSC 103 and transfers the data to the CLC 101.

Figure 2:
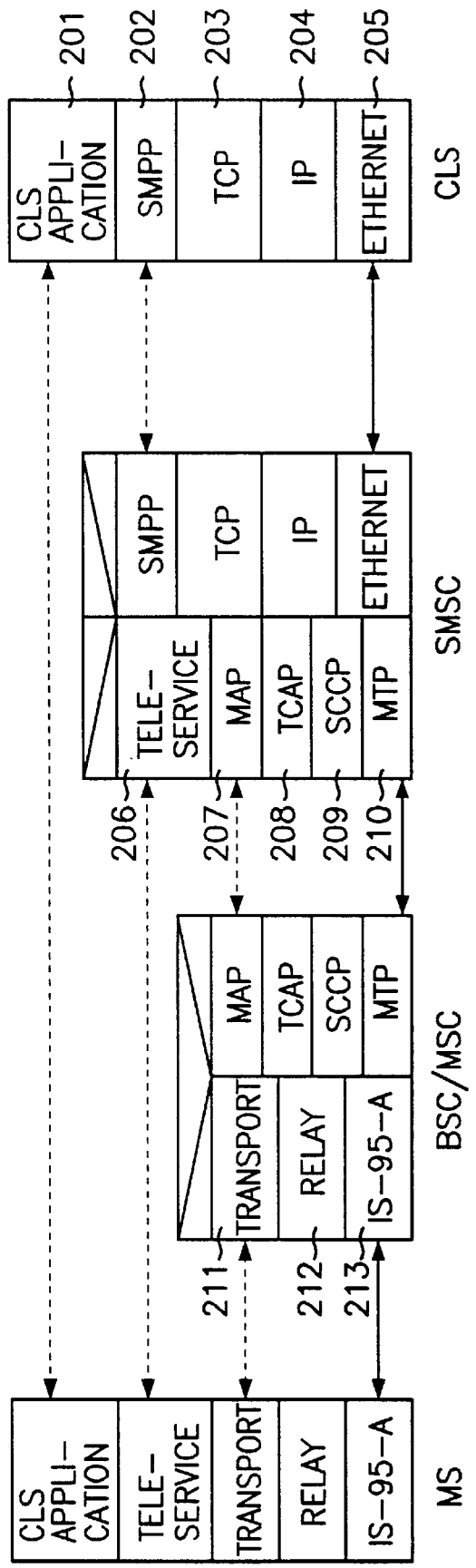
FIG. 2 is a diagram illustrating protocols of the digital mobile communication network applied to the present invention.

FIG. 2 shows a diagram illustrating protocols of the digital mobile communication network applied to the present invention.

The short message service (SMS) is a service which can transfer short messages between the MS 104 and the SMSC 102, using data burst message of the Paging Channel, the Access Channel and the Traffic Channels of a common air interface. There are general application services of the SMS, Voice Mail Notification (VMN), Cellular Paging Teleservice (CPT) and Cellular Messaging Teleservice (CMT). Teleservice Identifier (TI) parameter in transport layer protocol is used for discriminating the application services. To implement the cell location service (CLS), a new TI for the CLS should be assigned in the transport layer. The SMSC 102 should have a function which transfers the message including TI for the CLS to the CLC 101.

Protocol configuration for exchanging data between the CLC 101 and the terminal 104 is shown in FIG. 2. Data is exchanged by short message peer to peer protocol (SMPP) 202 based on TCP/IP 203 and 204 between the CLC 101 and the SMSC 102. The SMSC 102 converts SMPP message to IS-637 (TIA/EIA Interim Standard is Short Message Service for Wideband Spread Spectrum Cellular System) teleservice message, and communicates with the BSC/MSC 103 through signaling system 7 (SS 7) interface 206 to 210. The BSC/MSC 103 communicates with the MS 104 through IS-637 211, 212 and 213 and IS-95-A (TIA/EIA Interim Standard: Mobile Station-Base Station Compability for Dual-Mode Wideband Spread Spectrum Cellular Systems).

Figure 3:
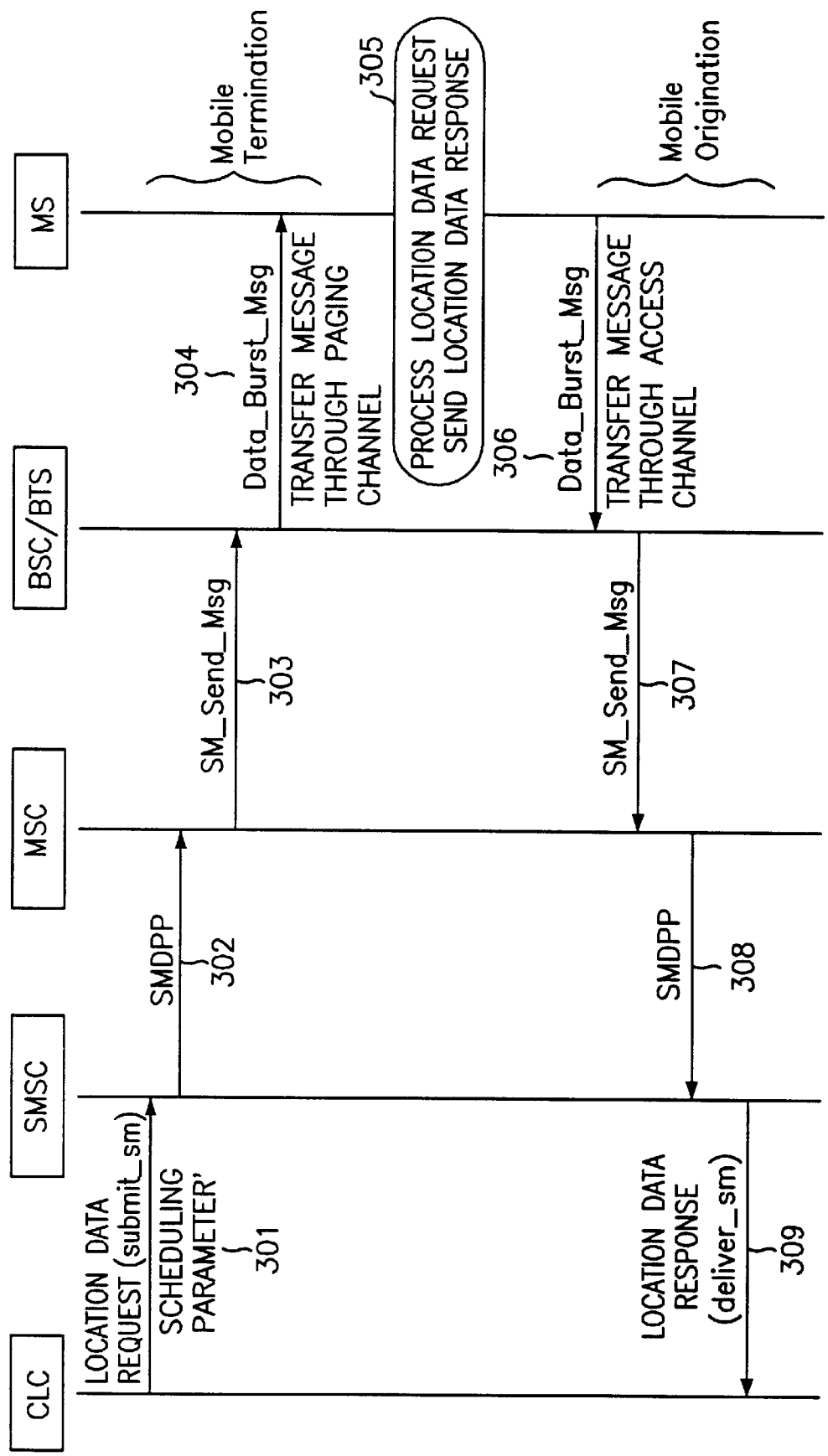
FIG. 3 is a diagram illustrating cell location service in accordance with the present invention.

Referring FIG. 3, a method for providing cell location service in accordance with the present invention is illustrated.

Since the MS 104 stores base station identifications which are uniquely defined in a mobile communication network, the CLC 101 may obtain the current location of the MS 104 when the MS provides the CLC with the identification of base station communicating with the MS 104. To obtain this information, it is necessary for the CLC 101 to communicate with the mobile communication network. It is easily implemented to use the short message service. That is, the CLC 101 requests through the SMSC 102 that the MS 104 provide location data informing of its current location. Then, the MS 104 transfers message including the base station identification to the CLC 101 through the SMSC 102. The CLC 101 may obtain the current location of the MS 104.

At this time, the location of the MS 104 can be obtained only if the base station identification is uniquely defined in the mobile communication network. Therefore, for unique definition of the base station, there are used some values of system parameters of paging channel to be described below in table 1.

TABLE 1

| PARAMETER | VALUE | LENGTH(BITS) |
|---|---|---|
| SID(System Identification) | network number (set for provider) | 15 |
| NID(Network Identification) | switching center number | 16 |
| BASE_ID (Base Station Identification) | base station number*16 + base transceiver system number | 16 |

The MS 104 stores the identification values, which are SID, NID and BASE_ID, received from the digital mobile communication network. The MS 104 transfers the values when the request is received from the CLC 101.

The cell location service is roughly divided to two part. One is mobile termination process where the CLC 101 requests the MS 104 to provide the cell location data. The other is mobile origination process where the MS 104 sends the CLC 101 the cell location data.

First, at step 301, the CLC 101 generates and transfers a location data request message submit_sm to the SMSC 102. At this time, for periodic report, the location data request message submit_sm may be included as a scheduling parameter.

The SMSC 102 receives and transfers the location data request message submit_sm from the CLC 101 to MSC using a short message deliver point to point (SMDPP) message at step 302. The MSC transfers the location data request message submit_sm to base station controller/base station transceiver system (BSC/BTS) using a short message transfer message SM_Send_Msg at step 303. The BSC/BTS transfers the location data request message submit_sm loaded on data burst message through the paging channel to the MS 104 at step 304.

The MS 104 receives the short message and examines TI whether the message is the location data request message submit_sm, or not. If so, the MS 104 analyzes command in user data area of the short message. When a instant report is required, the MS 104 generates data burst message Data_

Burst Msg including the base station identifications SID, NID and BASE_ID at step 305 and transfers the data burst message Data_Burst_Msg to the BSC/BTS at step 306. When a periodic report is required, the MS 104 stores parameter values, drives timer, generates data burst message Data_Burst_Msg at step 305 and transfers the data burst message Data_Burst_Msg to the BSC/BTS at step 306.

The BSC/BTS transfers the base station identifications to the MSC using the short message transfer message SM_Send_Msg at step 307. The MSC transfers the base station identifications to SMSC 102 using SMDPP message at step 308. The SMSC 102 transfers the base station identifications loaded on the location data response message for cell location service deliver_sm to the CLC 101 at step 309.

Figure 4:
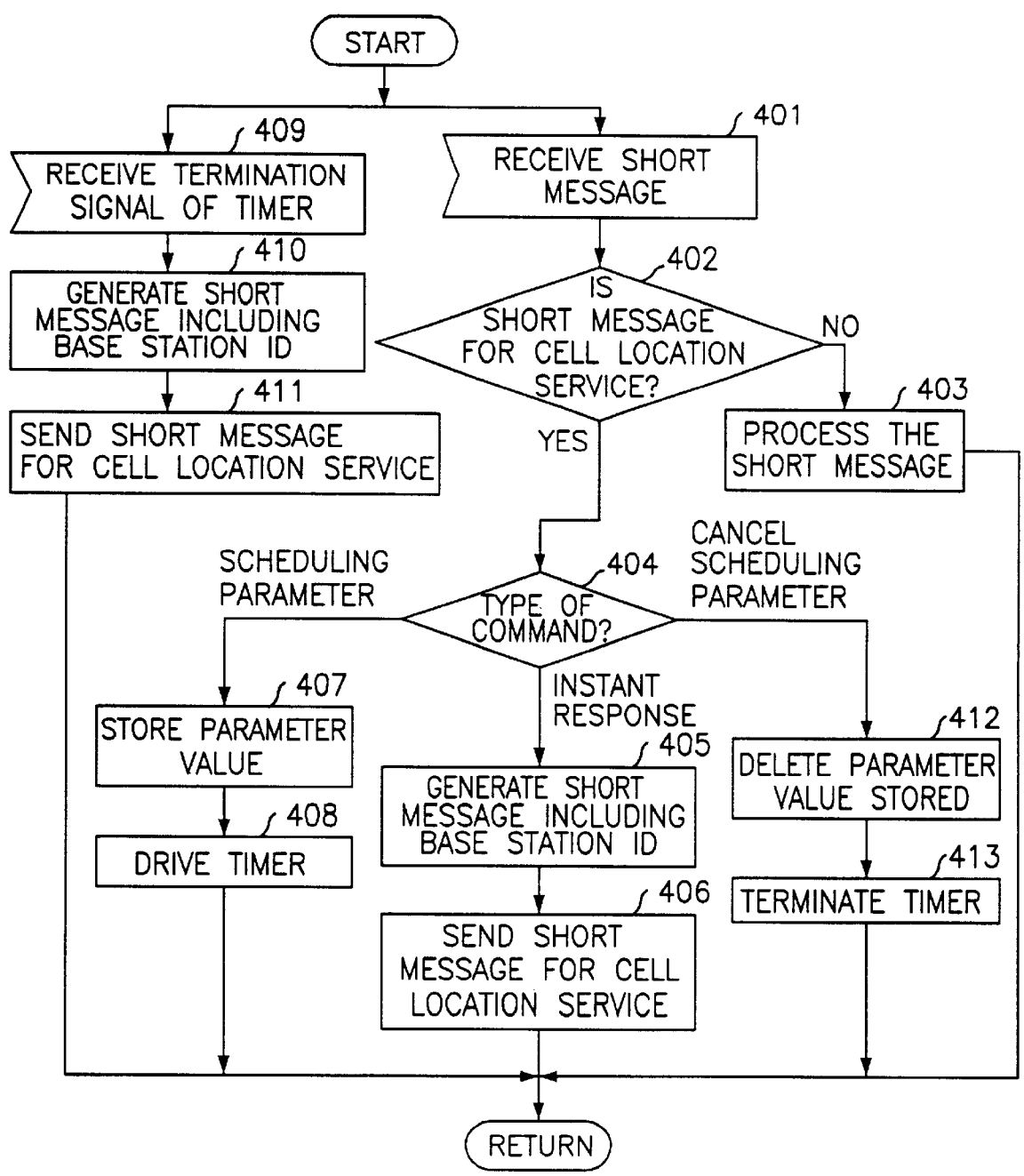
FIG. 4 is a detail flowchart illustrating cell location service at the mobile station in accordance with the present invention.

FIG. 4 shows a detail flowchart illustrating cell location service at the mobile station in accordance with the present invention.

The MS 104 receives the short message at step 401 and examines TI of which the message is the location data request message submit_sm at step 402. If the short message is not for the cell location service, the MS 104 processes the corresponding short message at step 403. If so, the MS 104 analyzes command in user data area of the short message at step 404. When a instant report is required, the MS 104 generates data burst message Data_Burst_Msg including base station identifications SID, NID and BASE_ID at step 405 and transfers the data burst message Data_Burst_Msg to the BSC/BTS at step 406. When a periodic report is required, the MS 104 stores parameter values at step 407, drives timer at step 408. When the timer termination signal is received at step 409, generates data burst message Data_Burst_Msg including the base station identification at step 410 and transfers the data burst message Data_Burst_Msg to the BSC/BTS through the access channel of a common air interface at step 411. When command to withdraw the scheduling parameter is received, the MS cancels the parameter stored in the memory at step 412 and stops the timer at step 413.

The cell location service as described above is employed to various value added services such as vehicle location service and emergency location service. Using the method as described above, current location of the mobile station can be obtained without an additional separate receiver. Therefore, the cell location service is implemented at low cost and complexity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing cell location service in a digital mobile communication network which provides short message service and comprises a plurality of mobile stations and base stations and a cell location center that is discrete from the plurality of mobile stations and maintains location information on each of said plurality of mobile stations in the digital mobile communication network the method including the steps of:

(a) generating, at the cell location center a cell location center request message requesting a location of a mobile station and transferring the cell location request message with a short message service for the mobile station;

(b) responsive to the cell location request message, generating, at the mobile station and at predetermined time intervals and transferring a response message having a base station identification representing the base station currently communicating with the mobile station to the cell location center; and (c) determining a physical location of the mobile station based on the base station identification received from the mobile station.

2. A method, as claimed in claim 1, wherein the base station identification includes network number, mobile switching center number, base station controller number and base transceiver number.

3. A method as claimed in claim 2, wherein the base station identification further includes various sector information.

4. A method as claimed in claim 2, wherein the cell location request message includes scheduling parameter requesting periodic report.

5. A method, as claimed in claim 4, wherein the step (b) includes the steps of:

storing the scheduling parameter in embedded memory when the scheduling parameter is included in the cell location request message; and transferring periodically the base station identification to the cell location center.

6. A method for providing cell location service in a digital mobile communication network which provides circuit switched data service and comprises a plurality of mobile stations and base stations and a cell location center which maintains location information on each of said plurality of mobile stations in the digital mobile communication network, the method including the steps of:

a) generating, at the cell location center, a cell location request message which requests a location of a mobile station and transferring the cell location request message with a short message for the mobile station;

b) responsive to the cell location request message, generating, at the mobile station and at predetermined time intervals, and transferring a response message having a base station identification representing the base station currently communicating with the mobile station to the cell location center; and (c) determining a physical location of the mobile station based on the base station identification received from the mobile station.

7. A method, as claimed in claim 6 wherein the base station identification includes network number, mobile switching center number, base station controller number and base transceiver number.

8. A method as claimed in claim 7, wherein the base station identification further includes various sector information.

9. A method as claimed in claim 7, wherein the cell location request message includes scheduling parameter requesting periodic report.

10. A method, as claimed in claim 9, wherein the step (b) includes the steps of:

storing the scheduling parameter in embedded memory when the scheduling parameter is included in the cell location request message; and transferring periodically the base station identification to the cell location center.

11. A method for providing cell location service in a digital mobile communication network which provides packet switched data service and comprises a plurality of mobile stations and base stations and a cell location center that maintains location information on each of said plurality of mobile stations in the digital mobile communication network, the method including the steps of:

a) generating at the cell location center a cell location request message seeking a location of a mobile station and transferring the cell location request message with a short message for the mobile station;

b) responsive to the cell location request message, at the mobile station, generating and transferring a response message at predetermined time intervals having a base station identification representing the base station currently communicating with the mobile station to the cell location center; and (c) determining a physical location of the mobile station based on the base station identification received from the mobile station.

12. A method, as claimed in claim 11, wherein the base station identification includes network number, mobile switching center number, base station controller number and base transceiver number.

13. A method as claimed in claim 12, wherein the base station identification further includes various sector information.

14. A method as claimed in claim 12, wherein the cell location request message includes scheduling parameter requesting periodic report.

15. A method, as claimed in claim 14, wherein the step (b) includes the steps of:

storing the scheduling parameter in embedded memory when the scheduling parameter is included in the cell location request message; and transferring periodically the base station identification to the cell location center.

16. A method for providing cell location service in a digital mobile communication network which provides a short message service and comprises a plurality of mobile stations and base stations and a cell location center which maintains location information on each of said plurality of mobile stations in the digital mobile communication network, the method including the steps of:

a) receiving at the mobile station, a base station identification representing a base station at a start of communication with the base station;

b) generating, at the cell location center, a cell location request message which requests a location of a mobile station and transferring the cell location request message with a short message for the mobile station;

c) responsive to the cell location request message, at the mobile station, generating and transferring a response message having the base station identification to the cell location center; and d) determining a physical location of the mobile station based on the base station identification received from the mobile station.

17. A method for providing cell location service in a digital mobile communication network which provides a circuit switched data service and comprises a plurality of mobile stations and base stations and a cell location center that is separate from the plurality of mobile stations and which maintains location information on each of said plurality of mobile stations in the digital mobile communication network, the method including the steps of:

a) receiving, at the mobile station a base station identification representing a base station at a start of communication with the base station;

b) generating, at the cell location center, a cell location request message requesting a location of a mobile station and transferring the cell location request message with a short message for the mobile station;

c) responsive to the cell location request message, generating, at the mobile station at predetermined time intervals, and transferring a response message having the base station identification to the cell location center; and d) determining a physical location of the mobile station based on the base station identification received from the mobile station.

18. A method for providing cell location service in a digital mobile communication network which provides a packet switched data service and comprises a plurality of mobile stations and base stations and a cell location center, the cell location center being discrete from the plurality of mobile stations and which maintains location information on each of said plurality of mobile stations in the digital mobile communication network, the method including the steps of:

a) receiving, at the mobile station, a base station identification representing a base station at a start of communication with the base station;

b) generating, at the cell location center a cell location request message which inquiry a location of a mobile station and transferring the cell location request message with a short message for the mobile station;

c) responsive to the cell location request message, generating, at the mobile station, and transferring a response message having the base station identification to the cell location center; and d) determining a physical location of the mobile station based on the base station identification received from the mobile station.

* * * * *